United States Patent
Martin

(10) Patent No.: US 6,514,414 B1
(45) Date of Patent: Feb. 4, 2003

(54) PROCESS FOR SEPARATION AND REMOVAL OF IRON IONS FROM BASIC ZINC SOLUTION

(75) Inventor: Vincent Wise Martin, Gastonia, NC (US)

(73) Assignee: Clariant Finance (BVI) Limited, Tortola (VG)

( * ) Notice: Subject to any disclaimer, the term of this patent is extended or adjusted under 35 U.S.C. 154(b) by 33 days.

(21) Appl. No.: 09/658,832

(22) Filed: Sep. 8, 2000

(51) Int. Cl.[7] .............................................. B01D 15/04
(52) U.S. Cl. ........................ 210/670; 210/688; 210/912
(58) Field of Search ................................ 210/670, 688, 210/912

(56) References Cited

U.S. PATENT DOCUMENTS

| | | | |
|---|---|---|---|
| 4,071,357 A | 1/1978 | Peters | 75/103 |
| 4,284,512 A * | 8/1981 | Hodgkin | 210/688 |
| 5,028,410 A | 7/1991 | Spink et al. | 423/622 |
| 5,204,084 A | 4/1993 | Robinson et al. | 423/622 |
| 5,453,111 A | 9/1995 | Myerson et al. | 75/725 |
| 5,500,126 A * | 3/1996 | Fries | 210/688 |
| 5,582,737 A | 12/1996 | Gula et al. | 210/673 |
| 5,759,503 A | 6/1998 | Myerson et al. | 423/101 |
| 5,945,170 A * | 8/1999 | Kozak et al. | 427/437 |
| 5,948,264 A | 9/1999 | Dreisinger et al. | 210/673 |
| 6,103,092 A * | 8/2000 | Silva | 210/688 |

OTHER PUBLICATIONS

Eichrom Product Literature "Diphonix™ Ion Exchange Resin", http://www.eichrom.com/process/prod/index.htm.
George Totura, Environmental Progress (vol. 15, No. 3) Fall 1996, "Innovative Uses of Specialty Ion Exchange Resins Provide New Cost–Effective Options for Metals Removal".
Eichrom Product Literature, "Diphonix® Ion Exchange Resin", http://www.eichrom.com/process/apps/index.htm.
Eichrom Product Literature, "Iron Control Process for Copper Electrolyte".
C.L. Warta and L.L. Duncan, "Removal of Iron and Zinc from Acidic Aqueous Streams Using Diphonix™ Resin".

* cited by examiner

Primary Examiner—Ivars Cintins
(74) Attorney, Agent, or Firm—Richard P. Silverman

(57) ABSTRACT

The present invention provides a process for the separation and removal of iron ions from a basic zinc solution. The process involves: treating an aqueous basic zinc solution with a solid ion exchange resin containing an insoluble cross-linked polymer which contains at least one pendant phosphonate group, at a pH of from about 8 to about 12, and a temperature of from about 10° C. to about 90° C., for a time period sufficient to form solid phase-bound iron ions and a liquid phase containing the aqueous basic zinc solution having an iron ion concentration that is substantially reduced; separating the solid phase-bound iron ions and the liquid phase; and treating the solid phase-bound iron ions with an aqueous acidic solution under conditions sufficient to regenerate the solid ion exchange resin.

22 Claims, No Drawings

PROCESS FOR SEPARATION AND REMOVAL OF IRON IONS FROM BASIC ZINC SOLUTION

TECHNICAL FIELD

The present invention provides a process for the separation and removal of iron ions from a basic zinc solution containing said iron ions. The present invention also provides a process for preparing zinc oxide that is substantially free of iron ions.

BACKGROUND OF THE INVENTION

Zinc oxide is a commercially important compound of zinc. It is used in rubber, paint, ceramics, emollients, and fluorescent pigments. It is also used in the organic field in the manufacture of zinc-containing organometallic compounds such as accelerators for the curing of rubber, and in the photocopying industry.

In one process, it is made from zinc hydrosulfite (zinc dithionite), which is converted to sodium hydrosulfite by the action of sodium hydroxide. In this reaction, zinc oxide is a byproduct. However, there is a need to further purify it for applications in various industries such as the rubber and cosmetic industry. The present invention provides a process for obtaining zinc oxide that is substantially free of iron ions, as well as a general process for the separation and removal of iron ions from a basic zinc solution.

U.S. Pat. No. 4,071,357, Peters, Jan. 31, 1978, discloses a process for recovering a substantially pure zinc oxide product from steel-making flue dust or a similar material which comprises leaching the flue dust with concentrated ammonia and carbon dioxide to dissolve zinc and unwanted impurities, cementing the leach filtrate with zinc to remove copper, cadmium, and lead impurities, conducting a steam distillation on the cementation filtrate to precipitate basic zinc carbonate, remove the ammonia and carbon dioxide, and iron impurities, and filtering to provide a residue of essentially basic zinc carbonate, sulfur, and chromium. This residue is then washed to remove soluble sulfates, dried and calcined at high temperatures to break down the basic zinc carbonate into zinc oxide, water washed to remove chromium and the residue of the water wash dried to produce the desired impurity-free zinc oxide product. The two water washes may be combined into one step performed after the calcining step to remove both sulfur and chromium in one step.

U.S. Pat. No. 5,582,737, Gula et al., Dec. 10, 1996, and U.S. Pat. No. 5,948,264, Dreisinger et al., Sep. 7, 1999, disclose an ion exchange separation, recovery and regeneration process for the control of iron to replace the conventional bleed stream process used in copper electrowinning. The process minimizes the loss of cobalt from the electrowinning circuit and strips the iron into a sulfate based solution suitable for leach solution makeup. In addition, this process can effect a lowering of the total iron concentration in the electrolyte circuit with an associated increase in current efficiency. The process captures the iron as iron (III) on an ion exchange medium containing a plurality of —CH$(PO_3R_2)_2$ or —C$(PO_3R_2)_2$— groups through which the divalent metal ions pass. The iron (III) is then reduced with copper(I) to form iron(II) that is freed from the exchange medium, thereby permitting regeneration of the medium.

U.S. Pat. No. 5,759,503, Myerson et al., Jun. 2, 1998, discloses a method for the recovery of high purity zinc oxide products, and optionally iron-carbon feedstocks, from industrial waste streams containing zinc oxide and/or iron. The waste streams preliminary can be treated by adding carbon and an ammonium chloride solution, separating any undissolved components from the solution, displacing undesired metal ions from the solution using zinc metal, treating the solution to remove therefrom zinc compounds, and further treating the zinc compounds and the undissolved components, as necessary, resulting in the zinc products and the optional iron-carbon feedbacks. Once the zinc oxide has been recovered, the purification process is used to further purify the zinc oxide to obtain zinc oxide which is at least 99.8% pure and which has a predeterminable purity and particle characteristics.

SUMMARY OF THE INVENTION

The present invention provides a process for the separation and removal of iron ions from a basic zinc solution comprising said iron ions, said process comprising the steps of:

(a) contacting an aqueous basic zinc solution that comprises said iron ions with a solid ion exchange resin comprising an insoluble cross-linked polymer, said polymer comprising at least one pendant phosphonate group;

(b) maintaining said contact at a pH of from about 8 to about 12, and a temperature of from about 10° C. to about 90° C., for a time period sufficient to form solid phase-bound iron ions and a liquid phase containing the aqueous basic zinc solution having an iron ion concentration that is substantially reduced compared to the solution from (a);

(c) separating the solid phase-bound iron ions and the liquid phase; and (d) contacting the solid phase-bound iron ions with an aqueous acidic solution under conditions sufficient to regenerate the solid ion exchange resin.

The present invention also provides a process for preparing zinc oxide that is substantially free of iron ions, said process comprising the steps of:

(a) contacting ammonium carbonate and zinc oxide to form a mixture comprising a zinc ammonia carbonate complex and metal impurities comprising iron, lead, and cadmium, and optionally sulfur compounds;

(b) optionally filtering the mixture from step (a) to produce a residue comprising mostly sulfur and a filtrate comprising mostly the zinc ammonium carbonate complex and metal impurities comprising iron, lead and cadmium;

(c) treating the filtrate from step (b), or the mixture from step (a) with zinc(0) to remove the lead and cadmium and to form a cementation product, and filtering the cementation product to form a cementation residue comprising mostly zinc, lead and cadmium and a cementation filtrate comprising mostly zinc and iron ions;

(d) contacting the cementation filtrate from step (c) with an ion exchange resin comprising an insoluble cross-linked polymer, said polymer comprising at least one pendant phosphonate group, and maintaining said contact for a time period sufficient to form solid phase-bound iron ions and a liquid phase containing the cementation filtrate having an iron ion concentration that is substantially reduced compared to the concentration of iron ions in the cementation filtrate in step (c);

(e) heating the liquid phase from step (d) to remove ammonia and to precipitate zinc ions in solution as mostly zinc carbonate;

(f) calcimining the zinc carbonate precipitate of step (e) at a temperature of from about 200° C. to about 1100° C. to convert the zinc carbonate to zinc oxide.

DETAILED DESCRIPTION OF THE INVENTION

The first step in the present process for the separation and removal of iron ions from a basic zinc solution involves contacting an aqueous basic zinc solution that contains iron ions with a solid ion exchange resin comprising an insoluble cross-linked polymer.

In a preferred embodiment, the iron ions to be removed are iron(III) ions although iron ions of other oxidation states such as Fe(II) or Fe(I) are also within the scope of the present invention.

The basic zinc solution is prepared in a similar way to that of U.S. Pat. No. 4,071,357 in that a zinc oxide wet cake is dissolved in a solution that contains ammonia and carbon dioxide bubbled into it to produce ammonium carbonate. A zinc-ammonia-carbonate complex is formed. The ammonium carbonate that forms the zinc-ammonia carbonate complex is preferably an ammoniacal-ammonium carbonate solution which can be prepared by feeding gaseous carbon dioxide into a concentrated ammonium hydroxide solution with vigorous stirring, as disclosed in U.S. Pat. No. 5,204, 084. While the basic zinc solution of the present invention preferentially contains ammonium hydroxide, the present process may also employ other basic zinc solutions such as those containing sodium hydroxide.

The insoluble crosslinked polymer of the solid ion exchange resin comprises at least one pendant phoshonate ($-PO_3R_2$) group. In one embodiment, the pendant phosphonate group is a monophosphonate group attached to a carbon atom, and is represented by the formula

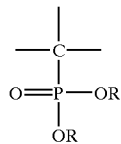

and in one embodiment, the pendant phosphonate group is a geminal diphosphonate group represented by the formula $-CH(PO_3R_2)_2$ or $>C(PO_3R_2)_2$ wherein R is hydrogen, a monovalent cation or the two R groups together are a divalent cation. Suitable examples of monovalent cations include ammonium ion ($NH_4^+$), a $C_1-C_4$ mono-, di-, tri- or tetraalkyl ammonium ion, or an alkali metal cation such as lithium, sodium, or potassium. The divalent cation can be an alkaline earth metal cation such as magnesium, calcium, and barium; or a transition metal such as copper(II), cobalt(II), iron(II) or manganese(II).

In a preferred embodiment, the insoluble crosslinked polymer comprising the gem-diphosphonate groups is a copolymer prepared from a variety of monomers, and the three preferred copolymer resins are described in Gula, et al., U.S. Pat. No. 5,582,737. Preferably, the ion exchange resin is in the form of ion exchange particles.

The three preferred copolymer resins are i) the vinylidene diphosphonic acid (or the alkyl or aryl esters thereof) tetrapolymers described in U.S. Pat. No. 5,281,631; ii) grafted pendent geminal diphosphonate copolymers such as those described in U.S. Pat. No. 5,618,851; and iii) gem-diphosphonate terpolymers such as those described in Sundell et al., *Chem. Mater.*, 5:372–376 (1993) and Sundell et al., *Polym. Prep.*, 33:992 (1992).

In one embodiment, the insoluble crosslinked polymer of the present solid ion exchange resin further comprises a pendant sulfonic acid group ($-SO_3H$). In one embodiment, the pendant sulfonic acid group is a benzene sulfonic acid group. In one embodiment, the insoluble crosslinked polymer further comprises a carboxylic acid group.

In a preferred embodiment, the solid ion exchange resin of the present invention is a copolymer available from Eichrom Industries, Inc. (Darien, Ill.; http://www.eichrom.com) under the name DIPHONIX™ ion exchange resin. Uses of DIPHONIX™ ion exchange resins are disclosed in U.S. Pat. Nos. 5,582,737 and 5,948,264. The DIPHONIX™ ion exchange resins can be obtained in various mesh sizes, including a 40–60 and 18–50 mesh size. The latter (larger size) is preferred.

The second step of the present process involves maintaining contact between the aqueous basic zinc solution and the solid ion exchange resin at a pH of from 8 to 12, and in one embodiment from 8–9, and in one embodiment from 10–12, and a temperature of 10° C. to 90° C., and in one embodiment from 30° C. to 70° C. A higher temperature facilitates the dissolution of zinc oxide and the ammonium carbonate in the basic zinc solution.

The contact between the basic zinc solution and the solid ion exchange resin is maintained for a time period sufficient to form solid phase-bound iron ions and a liquid phase containing the aqueous basic zinc solution, wherein the concentration of iron ions in the liquid phase is substantially reduced compared to that in the basic zinc solution prior to contact of the zinc solution with the ion exchange resin. Thus contact between the basic zinc solution and the ion exchange resin is maintained for a time period sufficient for the resin to bind iron ions. Because of the tight binding (affinity) between iron(III) ions and the ion exchange resin, binding to a given resin can be quite rapid and may be diffusion controlled.

However, when used in large quantities or even for accurate laboratory studies of binding coefficients, one to two or even more hours can be used to lead the ion exchange medium with iron ions. Thus, the contact time utilized can depend upon the user's purposes as well as the individual batch of ion exchange resin. Useful times for contacting can be readily determined by one of ordinary skill in the art, such as by carrying out iron binding studies similar to those illustrated in U.S. Pat. Nos. 5,582,737; 5,449,462; and 5,281,631, with varying maintenance times for loading the medium with a constant amount of iron(III) ions and a give set of stripping conditions.

In one embodiment, the amount of ion exchange resin and the concentration of iron ions to be removed are paired so there is an excess of exchange capacity over the equivalents of iron ions to be removed. Such a pairing minimizes the likelihood that some iron ions will not be separated and removed.

After the solid phase-bound iron ions and the liquid phase containing the aqueous basic zinc solution having a reduced concentration of iron ions have been formed during the maintenance step, the solid and liquid phases can be physically separated by simple decantation or centrifugation followed by decantation or other removal of the liquid phase.

In a preferred process where the ion exchange resin is in the form of particles that are contained in one or more columns, the solid and liquid phase separation is effected by elution, wherein the column is eluted with the basic aqueous zinc solution containing the iron ions.

While not wishing to be bound by theory, it is believed that the column resin material has much more affinity for iron ions than zinc ions. However because the eluting solution has a much higher concentration of zinc ions than iron ions, more zinc ions are initially absorbed by the column. With further elution, the iron ions displace the zinc ions from the column. Thus more of the zinc ions of the feed solution is recovered with time, while more iron ions remain absorbed to the column, resulting in an effective separation and removal of the iron ions from the zinc solution.

After the separation step effecting the separation of the solid phase-bound iron ions and the liquid phase, the solid phase bound iron ions are contacted with an aqueous acidic solution (such as hydrochloric or sulfuric acid, with hydrochloric acid being preferred) under conditions sufficient to regenerate the solid ion exchange resin. In one embodiment, the conditions to regenerate the ion exchange resin comprises performing the following steps in the order below:

(i) optionally backwashing the column with water;
(ii) passing an aqeous acid solution through the column;
(iii) passing water through the column;
(iv) optionally, backwashing the column with water until the liquid eluting off the column has a neutral pH;
(v) passing a solution of sodium or potassium hydroxide through the column; and
(vi) optionally passing water through the column.

In the above regeneration process, the aqueous acid solution passed through the column in step (ii) is typically a hydrochloric or sulfuric acid solution. In one embodiment, the concentration of the acid ranges from 3N to 12N. The purpose of eluting the column with the acid solution is to clean the column of any zinc ions that remained bound to resin after elution of the basic zinc solution through the column, as well as impurities such as iron and other metal ions. In step (v), the sodium or potassium hydroxide (e.g. 1N NaOH or KOH) passed through the column regenerates the column by converting the resin into the "sodium" or "potassium" form.

In a preferred embodiment, wherein the ion exchange resin is in the form of particles that are contained in a column, prior to contacting the aqueous basic zinc solution with the ion exchange resin, the ion exchange resin is conditioned by passing a solution of sodium hydroxide through the column of ion exchange resin. In one embodiment, 1 to 4 bed volumes of 1N NaOH is passed through the column. The column is then washed with water (i.e., water is eluted through the column) to remove as much of the excess NaOH as possible so as not to contaminate the subsequent basic zinc solution that is passed through the column with sodium. The column is then ready for eluting the basic zinc solution.

The present invention also provides a process for preparing zinc oxide that is substantially free of iron ions. The first step of this process involves contacting ammonium carbonate and zinc oxide to form a mixture comprising a zinc ammonia carbonate complex and metal impurities comprising iron, lead and cadmium, and optionally sulfur. As already disclosed hereinabove for the process for separation and removal of iron ions from basic zinc solution, the ammonium carbonate is preferably ammoniacal ammonium carbonate. The ammonium carbonate is derived as disclosed hereinabove from ammonia and carbon dioxide. The impurities comprising iron, lead, cadmium and sulfur are present in the zinc oxide made by the above-mentioned process from zinc hydrosulfite.

In the next step, which is optional, the mixture comprising the zinc ammonia carbonate complex, the metal impurities, and optionally sulfur is filtered to produce a residue comprising mostly sulfur and a filtrate comprising mostly the zinc ammonium carbonate complex and metal impurities comprising iron, lead and cadmium. The purpose of this filtration step is to remove the sulfur from the mixture.

In the next step, the filtrate from the optional filtration step above or the mixture from the first contacting step above is treated with zinc(0) (such as zinc metal or zinc dust) to form a cementation product. While not wishing to be bound by theory, it is believed that the zinc(0) replaces metal impurities like cadmium and lead on the ammonium carbonate complex metal sites, and forces these metal impurities out of solution as a precipitate, as disclosed in U.S. Pat. No. 4,071,357. The cementation product is then filtered to form a cementation residue comprising lead and cadmium and a cementation filtrate comprising mostly zinc and some iron ions. The cementation residue (solids) from this filtration may be discarded or further processed to recover the metal ions present therein.

The cementation filtrate is then contacted with an ion exchange resin, and the contact is maintained for a time period sufficient to form solid phase-bound iron ions and a liquid phase containing the cementation filtrate having an iron ion concentration that is substantially reduced compared to the concentration of iron ions prior to contact of the cementation filtrate with the ion exchange resin. The ion exchange resin herein is the same as that disclosed hereinabove with respect to the separation and removal of iron irons from a basic zinc solution, and the detailed conditions for the contact and maintenance of said contact are also the same.

The liquid phase containing the cementation filtrate with the reduced iron ion concentration is then heated to remove the ammonia and to the precipitate the zinc as mostly zinc carbonate. In a preferred embodiment, the heating step is a steam distillation or "steam stripping" step, wherein water is introduced as steam to into the system. The introduction of steam to the system gradually increases the temperature of the solution from room temperature to 80–100° C. This steam distillation drives off ammonia and some carbon dioxide, which can be recycled, and also helps to precipitate essentially all of the zinc in the solution as basic zinc carbonate.

The zinc carbonate precipitate is then isolated and calcined at a temperature of from 200° C. to about 1100° C., preferably from 250° C. to 700° C., more preferably from 400° C. to 600° C., to convert the zinc carbonate to zinc oxide. The carbon dioxide released during the calcining step can be recycled and reused.

EXAMPLES

The following specific examples will provide detailed illustrations of the methods of producing and utilizing compositions of the present invention. These examples are not intended, however, to limit or restrict the scope of the invention in any way and should not be construed as providing conditions, parameters or values which must be utilized exclusively in order to practice the present invention. Unless otherwise specified, all parts and percents are by weight, all temperatures are in degrees Centigrade, and all molecular weights are weight average molecular weight.

Example 1

A mixture comprising 400 grams of ammonium carbonate, 1200 grams of water, 80 grams of zinc oxide (ACS Grade; Fisher Scientific) and 4 milliliters (ml) of a 1000 ppm standard iron solution (Fisher Scientific) were heated to 50° C. for 10–30 minutes to dissolve the zinc oxide. The resulting mixture was filtered to remove any undissolved solids. The filtrate (having 2.5 ppm Fe and 4.05% zinc) was eluted through a column (100 ml buret) containing 56 ml of 18–50 mesh Diphonix™ resin (Eichrom Industries) at a rate of 5 mls/min in 250 ml increments. (Prior to eluting the filtrate, the column was preconditioned by eluting through it 250 ml of 1N NaOH, followed by 250 ml water to neutral pH). An aliquot of filtrate (about 5 ml) at about the end of each 250 ml eluting solution was collected and analyzed for iron and zinc concentrations by inductively coupled plasma (ICP). The results are shown in Table I below:

TABLE I

Iron and zinc concentrations in eluting basic zinc solution

| Elutant Volume (ml) | Fe (ppm) | Zn (%) |
|---|---|---|
| 0* | 2.5 | 4.05 |
| 250 | <0.3 | 3.97 |
| 500 | <0.3 | 4.02 |
| 750 | <0.3 | 4.08 |
| 1000 | 0.3 | 4.08 |
| 1250 | <0.3 | 4.12 |
| 1500 | <0.3 | 4.74 |

*In this and each table below, zero elutant volume refers to the elutant (basic zinc solution) prior to passing it through the column. The metal ion concentrations at zero elutant volume therefore refer to the concentrations in the basic zinc solution prior to passing said solution through the column.

Another basic zinc solution prepared by mixing together 400 grams of ammonium carbonate, 1200 ml of water, 70 grams of zinc oxide, and 4 ml of the 1000 ppm standard Fe solution, and heating to 50° C. The resulting solution was analyzed to contain 2.6 ppm Fe and 3.58% zinc. An amount (250 ml) of this solution was also eluted through the column at 5 ml/min as aforementioned, and a sample collected toward the end of the 250 ml eluting solution for analysis of iron and zinc. The results are shown in Table II below:

TABLE II

| Elutant Volume (ml) | Fe (ppm) | Zn (%) |
|---|---|---|
| 0 | 2.6 | 3.58 |
| 250 | 0.6 | 3.85 |

Since the iron level was now detectable by a HACH Kit (HACH catalog #1464-00; detection limit approximately 0.5 ppm), it was now desired to increase the iron concentration of the basic zinc solution prior to eluting it through the column. The iron concentration of the remainder of the above noneluted basic zinc solution was increased to 30 ppm by further addition of the standard Fe solution to the basic zinc solution, and 500 ml of resulting solution was further eluted through the column at 250 ml increments and aliquotes analyzed as aforementioned. The results are shown in Table III below:

TABLE III

| Elutant Volume (ml) | Fe (ppm) | Zn (%) |
|---|---|---|
| 250 | 0.6 | 3.57 |
| 500 | 2.6 | 3.59 |

It was now decided to regenate the column. The column was backwashed with water and further eluted (regular forward eluting) with 250 ml of water, and 1 liter of 6N hydrochloric acid. The column was further backwashed with water to neutral pH and eluted (regular forward elution) with 250 ml of 1N sodium hydroxide followed by 250 ml water.

Another basic zinc solution was prepared from a mixture comprising 400 grams of ammonium carbonate, 1200 ml water, 70 grams zinc oxide and 4 ml of 1000 ppm standard Fe solution, heating of the mixture and filtering to collect the filtrate, as aforementioned. The filtrate was analyzed to contain 2.4 ppm Fe. The filtrate containing the basic zinc solution was eluted through the regenerated column in several ml increments, and aliquots collected toward the end of each increment analyzed for iron concentration by inductively coupled plasma (ICP). The results are shown in Table IV below:

TABLE IV

| Elutant Volume (ml) | Fe (ppm) |
|---|---|
| 0 | 2.4 |
| 250 | <0.3 |
| 300 | <0.3 |
| 600 | <0.3 |
| 900 | <0.3 |
| 1050 | 0.33 |
| 1200 | 0.38 |
| 1350 | 0.36 |
| 1500 | 0.43 |
| 1650 | 0.47 |

This example illustrates that the Diphonix™ ion exchange resin is effective in absorbing iron ions from a basic zinc solution, and that the resin is also capable of being regenerated and reused.

Comparative Example 1

A mixture comprising 40 grams ammonium carbonate, 1200 ml water is heated to 30° C. to dissolve the ammonium carbonate. To this solution is added 140 g of wet cake of zinc oxide (obtained as a by product in the preparation of sodium hydrosulfite from zinc hydrosulfite; the wet cake of zinc oxide containing 95 grams of dry ZnO), and the resulting mixture heated to 35° C. to dissolve the zinc oxide. Zinc dust (1.5 grams) was then added, and the resulting mixture is filtered to remove mostly sulfur compounds and the cementation product with zinc, lead and cadmium in the residue. About 250 ml of this filtrate solution (containing approximately 3 ppm Fe and about 4% zinc) is then eluted through a column (a 100 ml buret) containing 50 ml of Purolite™ C-115 resin (a strong acid cationic resin obtained from Purolite) in two hours. Analysis of an aliquot of the eluted solution indicated an iron concentration of >1 ppm as determined by a HACH Kit for iron analysis. The results indicate that the Purolite™ C-115 resin was not as effective as the Diphonix™ resin of Example 1 above in absorbing iron ions from the basic zinc solution.

Comparative Example 2

A mixture comprising 400 g ammonium carbonate and 1200 ml water was heated to 35° C. Thereafter, 135 grams zinc oxide wet cake (obtained as a by product in the preparation of sodium hydrosulfite from zinc hydrosulfite; the wet cake of zinc oxide containing 95 grams of dry ZnO), and 1.5 grams zinc dust were added and the resulting mixture heated to 55° C. and filtered. A portion of the filtrate (containing 2.4 ppm Fe and 4.36% Zn) was recovered and eluted through a column (a 100 ml buret) containing 50 ml of Amberlite™ IRC-50 cation exchange resin (containing carboxylic acid groups; obtained from Rohm & Haas) at a rate of about 3–5 ml/min. As soon as zinc started to elute from the column (after about 30 ml of the filtrate had been eluted through the column), the concentration of iron ions as determined by a HACH kit was >0.5 ppm. The results indicate that the Amberlite™ IRC-50 resin was not as effective as the Diphonix ™ resin of Example 1 above in absorbing iron ions from the basic zinc solution.

Comparative Example 3

A portion of the uneluted filtrate (i.e., filtrate that had not been passed through the column) from comparative example 2 above was eluted through a column (a 100 ml buret) containing 50 ml of Purolite™ S-940 resin (a chelating resin highly selective for metals of low atomic weight; obtained from Purolite) in 250 ml portions at a rate of about 3–5 ml/min. An aliquot of the eluted filtrate toward the end of each 250 ml portion was analyzed for iron content by ICP. The results are shown in Table V below.

TABLE V

| Eluting Volume (ml) | Fe (ppm) |
| --- | --- |
| 0 | 2.4 |
| 250 | <0.3 |
| 500 | <0.3 |
| 750 | 0.36 |
| 1000 | 0.64 |

The results indicate that the Purolite™ S-940 resin absorbed iron ions for a short period of time, however, the capacity to absorb the iron ions was not as prolonged as the Diphonix™ resin of Example 1.

Comparative Example 4

A mixture comprising 260 grams ammonium carbonate and 800 ml water was heated to 35° C. Thereafter, 40 grams zinc oxide (ACS grade; Fisher Scientific) and 20 mls of a 1000 ppm Fe standard solution (Fisher Scientific) were added to the mixture and the resulting mixture was heated to 50° C. form a solution. The solution was analyzed to contain about 20 ppm of Fe and about 3% zinc. (The solution was intentionally prepared to contain a much higher level of iron than the previous examples to speed up the testing). A portion of this solution was eluted through a column (a 100 ml buret) containing 50 ml of the Purolite™ S-940 resin in several milliliter increments at a rate of about 3–5 ml/min. An aliquot of the eluted filtrate toward the end of each 250 ml portion was analyzed for iron content by the HACH test kit. The results are shown in Table VI below.

TABLE VI

| Eluting Volume (ml) | Fe (ppm) |
| --- | --- |
| 0 | ~20 |
| 250 | <0.5 |
| 275 | <0.5 |
| 300 | >0.5 |

Since after eluting 300 ml of the solution through the column, iron breakthrough (>0.5 ppm Fe as determined by the HACH test kit) was observed, it was decided to regenerate and reuse the column. The column was regenerated by: backwashing with water, followed by rinsing (normal forward elution) with water, eluting 200 ml of 1N HCl (no iron was detected at end of the 200 ml of eluting HCl), further eluting with another 200 ml of 1N HCl (no iron was detected at end of the 200 ml of eluting HCl), eluting with water to neutral pH, eluting with 200 ml of 1N NaOH, and finally eluting with water to neutral pH. A portion of the uneluted zinc solution from above was then eluted through the column at a rate of 3–5 ml/min in 100 ml increments. An aliquot of the eluted solution (at the end of each 100 ml increment) was analyzed for iron by the HACH kit. The results are shown in Table VII below.

TABLE VII

| Eluting Volume (ml) | Fe (ppm) |
| --- | --- |
| 0 | ~20 |
| 100 | 0.7–0.9 |
| 200 | ~1 |

The results indicate that while the Purolite™ S-940 resin did absorb the iron ions, it was not as effective in regeneration and reuse as the Diphonix™ resin of Example 1.

Each of the documents referred to above is incorporated herein by reference in its entirety, for all purposes. Except in the Examples, or where otherwise explicitly indicated, all numerical quantities in this description specifying amounts of materials, reaction and process conditions (such as temperature, time), and the like are to be understood to be modified by the word "about".

What is claimed is:

1. A process for the separation and removal of iron ions from a basic zinc solution comprising said iron ions, said process comprising the steps of:

(a) contacting an aqueous basic zinc solution that comprises said iron ions with a solid ion exchange resin comprising an insoluble cross-linked polymer, said polymer comprising at least one pendant phosphonate group;

(b) maintaining said contact at a pH of from about 8 to about 12, and a temperature of from about 10° C. to about 90° C., for a time period sufficient to form solid phase-bound iron ions and a liquid phase containing the aqueous basic zinc solution having an iron ion concentration that is substantially reduced compared to the solution from (a);

(c) separating the solid phase-bound iron ions and the liquid phase; and (d) contacting the solid phase-bound iron ions with an aqueous acidic solution under conditions sufficient to regenerate the solid ion exchange resin.

2. The process of claim 1, wherein the iron ions comprise $Fe^{3+}$ ions.

3. The process of claim 1, wherein the aqueous basic zinc solution comprises a zinc ammonia carbonate complex.

4. The process of claim 3, wherein the zinc ammonia carbonate complex is derived from zinc oxide and ammonium carbonate.

5. The process of claim 4, wherein the ammonium carbonate is an ammoniacal ammonium carbonate solution.

6. The process of claim 3, wherein the ammonium carbonate is derived from ammonia and carbon dioxide.

7. The process of claim 1, wherein the aqueous basic zinc solution comprises at least one member selected from the group consisting of ammonium hydroxide and sodium hydroxide.

8. The process of claim 1, wherein in step (b), the pH is about 8–9.

9. The process of claim 1, wherein in step (b), the pH ranges from about 9 to about 12.

10. The process of claim 1, wherein the temperature is from about 30° C. to about 70° C.

11. The process of claim 1, wherein the pendant phosphonate group is a monophosphonate group represented by the formula

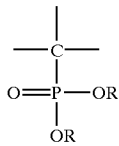

or a geminal diphosphonate group represented by the formula—$CH(PO_3R_2)_2$ or $>C(PO_3R_2)_2$ wherein R is hydrogen, a monovalent cation or the two R groups together are a divalent cation.

12. The process of claim 11, wherein the monovalent cation is an ammonium ion ($NH_4^+$), a $C_1$–$C_4$ mono, di-, tri- or tetra-alkyl ammonium ion, or an alkali metal cation.

13. The process of claim 11, wherein the divalent cation is an alkaline earth metal cation.

14. The process of claim 1, wherein the polymer further comprises at least one pendant sulfonic acid group.

15. The process of claim 14, wherein the sulfonic acid group is a benzenesulfonic acid group.

16. The process of claim 1, wherein the polymer further comprises at least one carboxylic acid group.

17. The process of claim 1, wherein the solid ion exchange resin has a mesh size of about 15 to about 50 mesh.

18. The process of claim 1, wherein in step (b), the ion exchange resin is in the form of particles that are contained in one or more columns, and wherein in step (c), the solid and liquid phase separation is effected by elution.

19. The process of claim 1, wherein prior to contacting the zinc solution with the solid ion exchange resin in step (a), the ion exchange resin is conditioned by passing a solution of potassium or sodium hydroxide through the ion exchange resin.

20. The process of claim 1 wherein in step (d), the conditions sufficient to regenerate the solid ion exchange resin comprise performing the steps below in the following order:

(i) optionally backwashing the column with water;

(ii) passing an aqueous acid solution through the column;

(iii) passing water through the column;

(iv) optionally backwashing the column with water until the liquid eluting off the column has a neutral pH;

(v) passing a solution of sodium or potassium hydroxide through the column; and (vi) optionally passing water through the column.

21. The process of claim 20, wherein in step (ii), the aqueous acid solution is an aqueous hydrochloric solution having a concentration of about 3N to about 12N.

22. The process of claim 20, wherein in step (v), a 1N sodium hydroxide solution is passed through the column.

* * * * *